(12) United States Patent
Mitelman et al.

(10) Patent No.: US 11,061,101 B2
(45) Date of Patent: Jul. 13, 2021

(54) METHODS AND APPARATUS FOR CALIBRATING RFID READERS AND RELATED RFID LOCATIONING SYSTEMS

(71) Applicant: ZEBRA TECHNOLOGIES CORPORATION, Lincolnshire, IL (US)

(72) Inventors: Yuly Mitelman, Stony Brook, NY (US); Michael J. Koch, Fort Salonga, NY (US); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 311 days.

(21) Appl. No.: 16/293,339

(22) Filed: Mar. 5, 2019

(65) Prior Publication Data
US 2020/0284869 A1    Sep. 10, 2020

(51) Int. Cl.
*G01S 5/14*  (2006.01)
*G01S 5/02*  (2010.01)

(52) U.S. Cl.
CPC ............. *G01S 5/0221* (2013.01); *G01S 5/14* (2013.01)

(58) Field of Classification Search
CPC .................................................... H04W 64/00
USPC ........................................................ 342/451
See application file for complete search history.

(56) References Cited

U.S. PATENT DOCUMENTS

| 10,212,553 | B1* | 2/2019 | Ambha Madhusudhana ............. H04W 4/027 |
| 10,410,027 | B1* | 9/2019 | Song ........................ G06F 16/29 |
| 2007/0013522 | A1* | 1/2007 | Chiu ..................... G06K 7/0095 340/572.1 |
| 2011/0043373 | A1* | 2/2011 | Best .......................... G01S 1/68 340/8.1 |
| 2015/0123869 | A1* | 5/2015 | Bit-Babik .............. H01Q 19/10 343/857 |
| 2017/0344773 | A1* | 11/2017 | Lauria ................ G06K 7/10475 |

FOREIGN PATENT DOCUMENTS

WO    WO-2017220148 A1 * 12/2017    ......... G06K 19/0723

* cited by examiner

*Primary Examiner* — Harry K Liu
(74) *Attorney, Agent, or Firm* — Yuri Astvatsaturov

(57) ABSTRACT

A radio frequency (RF) identification (RFID) reader calibration system for use with a venue includes an RFID reader having a primary identifier and a plurality of secondary identifiers. The primary identifier and each of the plurality of secondary identifiers having a respective unobstructed line of sight to a point on the floor of the venue. The RFID reader calibration system also includes a data capture device configured to be aimed at the primary identifier and the plurality of secondary identifiers and to capture respective coordinates of the primary identifier and each of the plurality of secondary identifiers. The RFID reader calibration system also includes a controller configured to determine: a location of the RFID reader based on the coordinates of the primary identifier; and an orientation of the RFID reader based on the respective coordinates of the primary identifier and each of the plurality of secondary identifiers.

20 Claims, 8 Drawing Sheets

METHODS AND APPARATUS FOR CALIBRATING RFID READERS AND RELATED RFID LOCATIONING SYSTEMS

FIELD OF THE DISCLOSURE

The present patent relates generally to RFID readers and, in particular, relates to methods and apparatus for calibrating RFID readers and related RFID locationing systems.

BACKGROUND

Radio frequency (RF) identification (RFID) technology is becoming increasingly important for logistics concerns, material handling and inventory management in retail stores, warehouses, distribution centers, buildings, and like controlled areas. Use of radio frequency (RF) identification (RFID) tags in association with tracking items is relatively common. RFID tags, which can be attached to items and can be programmed to carry a payload data associated with the respective items. Tracking the RFID tags and/or reading the tag payload enables one to track the associated articles and gather intelligence thereon. As the use of RFID tags continues to expand, so does the need for accurately estimating their locations. This applies to a wide range of venues (including retail stores, packaging facilities, storage facilities, etc.), and environments (including storage rooms, delivery vehicles, containers, etc.).

Accordingly, there exists a need for improved methods and apparatus for calibrating RFID system readers and related RFID locationing systems.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
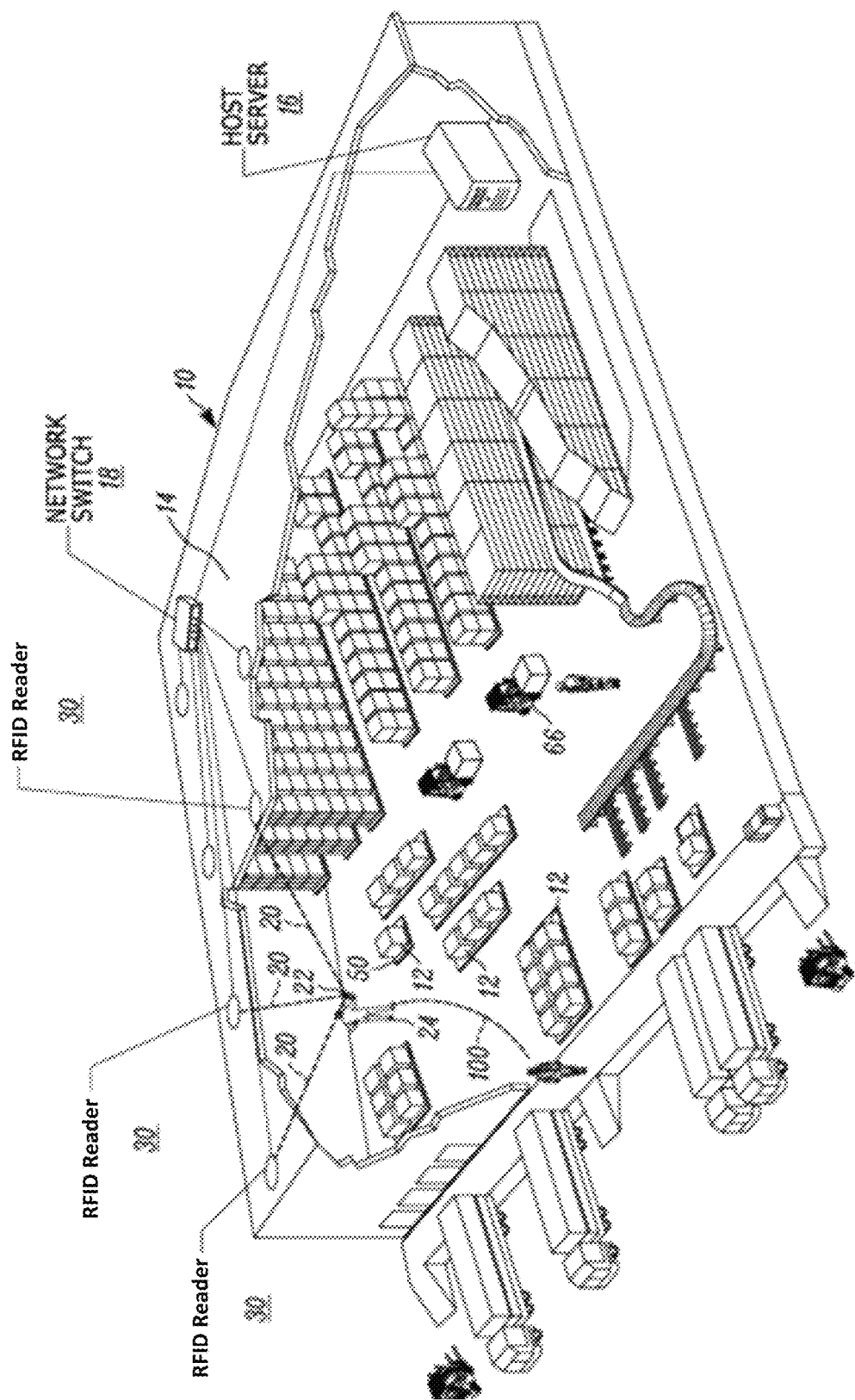
FIG. 1 is a broken-away, perspective view, as seen from above, of an arrangement for locating and tracking a mobile target in a venue in which a plurality of RFID readers are deployed, in accordance with an example.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

In a first example, a radio frequency (RF) identification (RFID) reader calibration system for use with a venue includes an RFID reader. The RFID reader is suspended from a ceiling. The RFID reader includes a housing. The housing includes a first surface and a second surface. The first surface faces a downward direction away from the ceiling and toward a floor of the venue and the second surface facing an upward direction toward the ceiling. The housing also includes a sidewall extending between the first surface and the second surface. The RFID reader further includes a primary identifier and a plurality of secondary identifiers. The primary identifier is positioned on the first surface and the plurality of secondary identifiers are positioned on at least one of the second surface and the sidewall. The primary identifier and each of the plurality of secondary identifiers includes a respective unobstructed line of sight to a point on the floor of the venue. The RFID reader calibration system also includes a data capture device. The data capture device is configured to be aimed at the primary identifier and the plurality of secondary identifiers and to capture respective coordinates of the primary identifier and each of the plurality of secondary identifiers. The data capture device also includes a controller configured to (i) receive, from the data capture device, the respective coordinates of the primary identifier and each of the plurality of secondary identifiers and (ii) to determine: a location of the RFID reader based on the coordinates of the primary identifier; and an orientation of the RFID reader based on the respective coordinates of the primary identifier and based on the coordinates of each of the plurality of secondary identifiers, the orientation including at least one pitch, roll, and azimuth.

In a variation of the first example, the RFID reader calibration system further includes a locationing server, the locationing server is configured to compare at least one of the location of the RFID reader and the orientation of the RFID reader to a reference orientation to generate calibration data, wherein the calibration data compensates for a difference between the orientation of the RFID reader and the reference orientation. In another variation of the first example, the RFID calibration system further includes an azimuth identifier positioned on the second surface. The azimuth identifier is associated with a predetermined azimuth value. When the RFID reader is suspended from the ceiling, the housing is positioned such that the azimuth identifier is positioned substantially at the predetermined azimuth value relative to a substantially vertical axis passing through the primary identifier.

In a second example, a method of calibrating a radio frequency (RF) identification (RFID) system for use in a venue includes aiming a data capture device at a primary identifier and a plurality of secondary identifiers of an RFID reader to determine coordinates of respective ones of the primary identifier and the plurality of secondary identifiers. The RFID reader includes a housing having a first surface facing a downward direction away from a ceiling and toward a floor of the venue, a second surface facing an upward direction toward the ceiling, and a sidewall extending between the first surface and the second surface. The primary identifier is positioned on the first surface and the plurality of secondary identifiers are positioned on at least one of the second surface and the sidewall. The primary identifier and the plurality of secondary identifiers have an unobstructed line of sight to a point on the floor of the venue. The method also includes receiving the coordinates associated with the primary identifier and the plurality of secondary identifiers at a controller and determining: a location of the RFID reader based on the coordinates of the primary identifier; and an orientation of the RFID reader based on the respective coordinates of the primary identifier and based on the coordinates of each of the plurality of secondary identifiers, the orientation including at least one pitch, roll, and azimuth.

In a variation of the second example, the method includes, prior to aiming the data capture device at the primary identifier and the plurality of secondary identifiers, positioning the housing such that an azimuth identifier is positioned substantially at a predetermined azimuth value relative to a substantially vertical axis passing through the primary identifier, the azimuth identifier positioned on the second surface, the azimuth identifier being associated with the predetermined azimuth value.

In a third example, a radio frequency (RF) identification (RFID) locationing system for use in a venue includes a plurality of RFID readers suspended from a ceiling of the venue, each of the RFID readers is configured to estimate a bearing of an RFID tag positioned within the venue. Each of the plurality of RFID readers having: a housing with (i) a first surface facing a downward direction away from the ceiling and toward a floor of the venue, (ii) a second surface facing an upward direction toward the ceiling, and (iii) a sidewall extending between the first surface and the second surface. The plurality of RFID readers having a primary identifier positioned on the first surface and a plurality of secondary identifiers positioned on at least one of the second surface and the sidewall. The primary identifier and each of the plurality of secondary identifiers having a respective unobstructed line of sight to a point on the floor of the venue. The RFID locationing system also includes a locationing server in communication with each of the plurality of RFID readers. The locationing server is configured to (i) receive a plurality of bearings of the RFID tag from at least two of the RFID readers. Each of the plurality of bearings of the RFID tag being received from one of the at least two of the RFID readers, and (ii) estimate a position of the RFID tag within the venue based on the (i) plurality of bearings of the RFID tag, (ii) a respective location of each of the at least two of the RFID readers, and (iii) a respective orientation of each of the at least two of the RFID readers. The respective location of each of the at least two of the RFID readers is determined by a controller and is based at least on primary coordinate data associated with the primary identifier of each of the at least two of the RFID readers. The primary coordinate data is associated with the primary identifier of each of the at least two of the RFID readers being received by the controller from an optical data capture device configured to capture respective coordinates of the primary identifier of each of the at least two of the RFID readers. The respective orientation of each of the at least two of the RFID readers is determined by the controller and is based at least on the primary coordinate data associated with the primary identifier of each of the at least two of the RFID readers and secondary coordinate data associated with the plurality of secondary identifiers of each of the at least two of the RFID readers. The secondary coordinate data is associated with the plurality of secondary identifiers of each of the at least two of the RFID readers being received by the controller from the optical data capture device configured to capture respective coordinates of the plurality of secondary identifiers of each of the at least two of the RFID readers.

FIG. 1 depicts an example venue 10 in the form of a warehouse in which movable products 12, shown in FIG. 1 as cuboid cartons for simplicity, may be located and tracked in accordance with the techniques described herein. The venue 10 may be any indoor or outdoor venue, and may have any layout or configuration. In some examples, each mobile product 12 is tagged with a mobile target, such as a radio frequency (RF) identification (RFID) product tag, such as a passive or active RFID tag. The RFID product tag may be associated with a single product, which may represent one warehoused item or multiple warehoused items. In some examples, the RFID product tag is associated with a pallet 50, or a container, for supporting multiple products 12.

As also shown in FIG. 1, a plurality of RFID readers 30 are deployed in the venue 10. Each RFID reader 30 may be stationarily and fixedly mounted at known overhead positions, for example, on, or adjacent to, a ceiling 14. Merely by way of example, the RFID reader 30 can be installed every twenty to eighty feet or so apart in a grid pattern. The numbers of RFID readers 30 may depend on the size of the venue, e.g., thirty, sixty, ninety, or more stations in a venue.

A network computer or host server (controller) 16, typically locally located in a backroom at the venue 10, comprises one or more computers and is in wired, wireless, direct, or networked communication with each RFID reader 30, for example, through a network switch 18. The controller 16 may on-sight, off-sight and/or may be remotely hosted in a cloud server. The controller 16 may include a wireless RF transceiver that communicates with each RFID reader 30. For example, Wireless Fidelity (Wi-Fi) and Bluetooth® are open wireless standards for exchanging data between electronic devices. The server or controller 16 controls each RFID reader 30. Albeit, in other examples, any of functions of the controller 16 described herein may be implemented at any one or more of the RFID readers 30.

The computer systems and stations described herein may be connected via a communication network, which can include local and wide-area wireless networks, wired networks, or other IEEE 802.11 or Wi-Fi™ wireless communication systems, including virtual and extended virtual networks. It is envisioned that the communication network includes a controller and various RFID readers that provide the operations described herein. It should be recognized that the present techniques could also be applied to any suitable wireless communication system. For example, the description that follows can apply to one or more communication networks that are IEEE 802.xx-based, employing wireless technologies such as IEEE's 802.11, 802.16, or 802.20, modified to implement embodiments of the present invention. The protocols and messaging needed to establish such networks are known in the art and will not be presented here for the sake of brevity.

Figure 2:
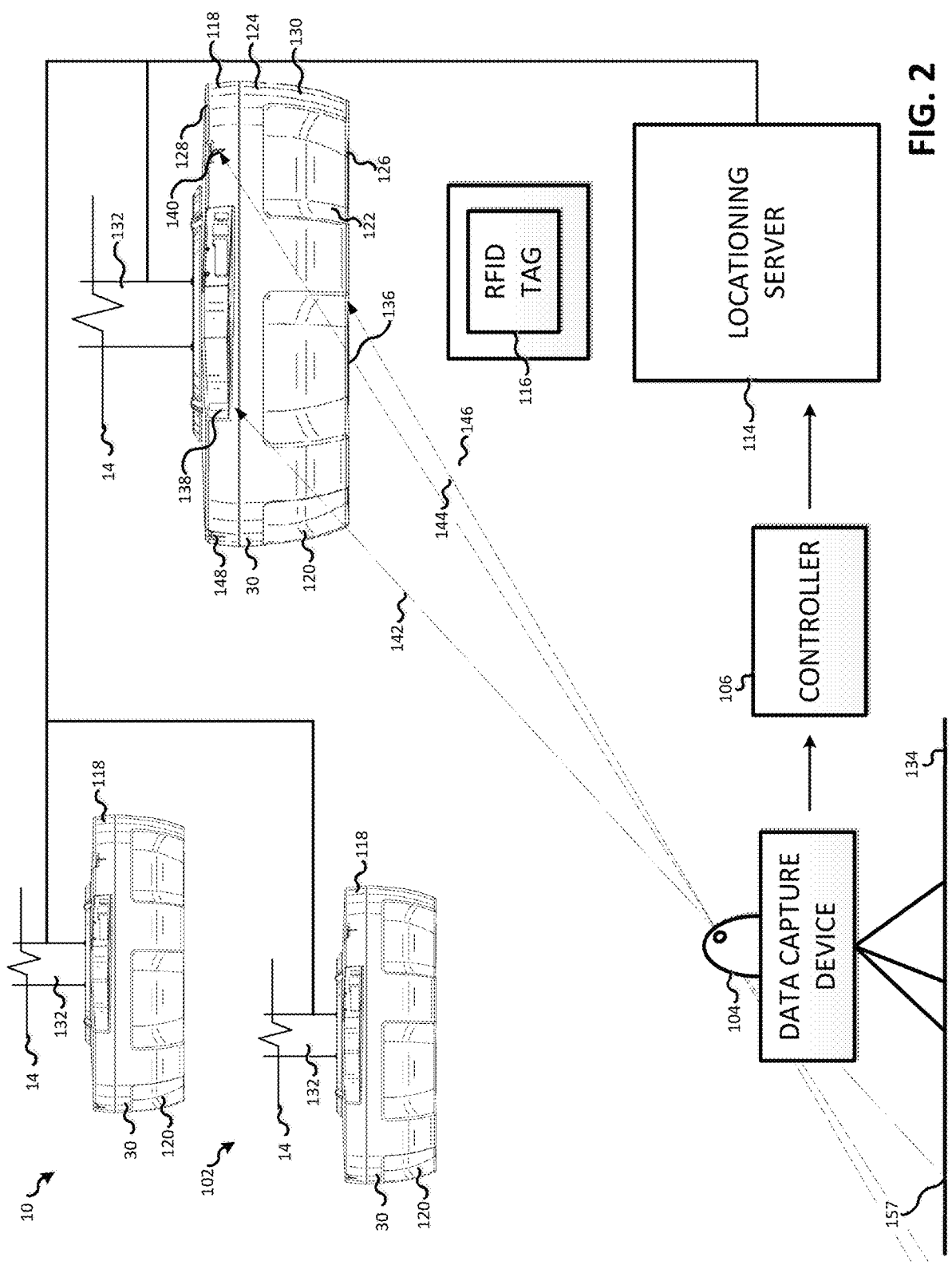
FIG. 2 illustrates a portion of the venue of FIG. 1 including a radio frequency (RF) identification (RFID) reader calibration system in accordance with the teachings of this disclosure, where the RFID reader calibration system includes a data capture device, a controller, the plurality of RFID readers and a locationing server.

FIG. 2 illustrates a portion of the venue 10 that includes a radio frequency (RF) identification (RFID) reader calibration system 102. The RFID reader calibration system 102 includes a data capture device 104, a controller 106, a plurality of the RFID readers 30 and a locationing server 114. The controller 106 and/or the locationing system 114 may be implemented by the server or the controller 16 of FIG. 1. The data capture device 104 may be a laser-based ranging device and may be positioned in a known reference position within the venue 10.

The data capture device 104 and the controller 106 may be configured to calibrate the RFID readers 30. The RFID readers 30 may be configured to estimate bearings of an RFID tag 116 and the locationing server 114 may be configured to estimate a location of the RFID tag 116 based on the bearings received from the RFID readers 30. Additionally, as discussed in more detail below, the locationing server 114 may determine the location of the RFID tag 116 based on calibration data determined when calibrating the RFID readers 30. The calibration data may account for a difference between the actual location (e.g., actual azimuth) of the RFID readers 30 and a reference orientation (e.g., reference azimuth) associated with, for example, a pitch of 0° and a roll of 0° defined relative to the floor and a reference azimuth, which in some embodiments may be referred to as "true north."

The RFID readers 30 are suspended from the ceiling 14 and each includes a base 118 and a radome 120. In some examples, the base 118 has a substantially circular perimeter and the radome 120 inwardly tapers from the base 118. The radome 120 also includes scalloped portions 122 (the scalloped portions 122 are better visible in FIG. 3) that inwardly extend relative to a central axis of the RFID readers 30. However, the base 118 or the radome 120 may have a different shape or may include different surface structures.

The base 118 and the radome 120 form a housing 124. In the illustrated example, the housing 124 includes a first surface 126, a second surface 128, and a side wall 130. The first and second surfaces 126, 128 oppose one another, and the side wall 130 extends between the first and second surfaces 126, 128. In the example shown, the first surface 126 is formed by the radome 120, the second surface 128 is formed by the base 118 and the side wall 130 is formed by the base 118 and the radome 120. When the RFID reader 30 is attached to the ceiling 14 via a pole 132, the first surface 126 faces a downward direction away from the ceiling 14 and toward a floor 134 and the second surface 128 faces an upward direction toward the ceiling 14.

The RFID readers 30 also include a plurality of identifiers. The identifiers may be used when orienting the RFID readers 30 during an installation procedure and when calibrating the RFID readers 30. The identifiers that may be used during the calibration procedure include a primary identifier 136 (the primary identifier 136 is better visible in FIG. 2) and at least two of a plurality of secondary identifiers 138, 140, 148, 152, 154, 156 (the secondary identifiers 138, 140, 148, 152, 154, 156 are better visible in FIG. 4). The primary identifier 136 and the secondary identifiers 138, 140 may be fixed relative to an antenna array 141 (shown in FIG. 6) of the RFID reader 30 and, thus, provide exterior-visual markings that indicate the orientation of the antenna array 141 within the RFID readers 30.

In an example, the primary identifier 136 is positioned on the first surface 126, and the secondary identifiers 138, 140, 148, 152, 154, 156 are positioned on at least one of the second surface 128 and the side wall 130. In the example shown, axes extending between the central axis and through two of the secondary identifiers 138, 140 are spaced approximately 66° from one another. However, the secondary identifiers 138, 140 may be positioned in different locations and still be configured to be used when calibrating the RFID device 30.

In an installation procedure, it may be desirable to orient the RFID readers 30 to be in alignment with one another, for example, to be oriented in the same manner. To determine a location and an orientation of the RFID readers 30, unobstructed (with the exception of the data capture device 104) lines of sight 142, 144, 146 are provided between (i) the primary identifier 136 and at least two of the secondary identifiers 138, 140, 148, 152, 154, 156 and (ii) the floor 134 of the venue 10 on which the data capture device 104 is positioned. Preferably, the data capture device 104 is located at a reference position 157 (e.g., identified by a given set of spatial coordinates (e.g., X, Y, Z) relative a spatial point within the venue 10) that has unobstructed lines of sight to each of the RFID readers 30. With the unobstructed lines of sight 142, 144, 146 between the identifiers and the floor 134, the data capture device 104 can be positioned within the lines of sight 142, 144, 146 and aimed at each of the identifiers 136, 138, 140 to capture respective coordinates of the identifiers 136, 138, 140. For example, to determine the coordinates of the identifiers 136, 138, 140, the data capture device 104 can be programmed or may be otherwise directed to point a laser at each of the identifiers 136, 138, 140 to measure specular reflection. While this example mentions the identifiers 138, 140 for the sake of clarity, the data capture device 104 may additionally or alternatively be aimed at any one of the secondary identifiers 138, 140, 148, 152, 154, 156.

The coordinates may be used by the controller 106 to determine a spatial location and/or an orientation of the RFID reader 30. If an unobstructed line of sight is not provided between the data capture device 104 and the secondary identifiers 138, 140, for example, the data capture device 104 may alternatively be aimed at any combination of two secondary identifiers 138, 140, 148, 152, 154, 156. Like the secondary identifiers 138, 140, the other secondary identifier 138, 140, 148, 150, 154, 156 may also be formed on at least one of the second surface 128 and the side wall 130. In the event that that the data capture device 104 must be repositioned from a first location to another location when determining the locations and orientations of the various RFID readers 30 within the venue 10, it should be understand that its position relative to the reference point 157 may be taken into account.

To determine an orientation and a location of the RFID reader 30, the controller 106 is configured to receive the spatial coordinates (e.g., X, Y, Z) of the primary identifier 136 and the second identifiers 138, 140 from the data capture device 104. The controller 106 may directly receive the spatial coordinates from the data capture device 104 via a wired or wireless connection or the controller 106 may receive the coordinates via a removable flash memory card or in any other suitable way. Based on the coordinates of at least the primary identifier 136, the controller 106 may determine a location (e.g., a spatial location) of the RFID reader 30 relative to the reference point 157. The reference point 157 may be defined by the data capture device 104 or may be another arbitrarily defined point within the venue 10, for example, a chosen corner. In some embodiments, the controller 106 may determine the location of RFID reader 30 based on both the primary identifier 136 and the secondary identifiers (in this case 138, 140). Additionally, the controller 106 may determine an orientation of the RFID reader 30 based on the coordinates of the primary identifier 136 and the secondary identifiers 138, 140 relative to the spatial layout of the venue 10 and the reference azimuth. This may done by programming the controller 106 with the dimensions and/or layout of the RFID readers 30 and the positioning of those components relative to the various identifiers of the respective RFID readers 30. From this, it is possible to reconstruct the location and orientation of the RFID reader 30 and/or the internal elements thereof upon determining the locations of the identifiers in free space. The orientation of the RFID reader 30 may include at least one of pitch, roll, and azimuth. A pitch of 0° and a roll of 0° may be associated with the floor 134 of the venue 10 and the azimuth of 0° may be associated with a direction that may be referred to as "true north."

The location and the orientation of the RFID reader 30 are within a coordinate space of the venue in relation to the reference point 157 such as, for example, a corner of the venue 10. Thus, the controller 106 may determine the location and the orientation of the RFID readers 30 in such a manner that it is possible to establish a spatial map of the RFID readers 30 within the venue 10 and to capture the relative position and orientation of the RFID readers 30 relative to each other and/or a reference point within the venue 10.

The locationing server 114 may take the location and the orientation of the respective RFID readers 30 into account when determining a position of the RFID tag 116. Specifically, in some examples, the locationing server 114 is configured to build a locationing correction model specific to the venue 10, which is generated from the calibration process and used during locationing to account for off-sets between the reference orientation (e.g., a reference azimuth) and the actual orientation (e.g., an actual azimuth) of the RFID readers 30. For instance, if the RFID reader 30 determines that the RFID tag 116 is positioned in a direction having a bearing of 90° azimuth and a 45° elevation relative to its internal structure, with the RFID reader 30 being orientated at 0° pitch, 0° roll and 2° azimuth, relative to true north (e.g., a reference azimuth), the locationing server 114 can compensate for the azimuth off-set and determine that the actual bearing of the RFID tag 116 is at 92° azimuth and a 45° elevation. Using the disclosed examples, the accuracy of the determined position of the RFID tag 116 as determined by the locationing server 114 may yield significantly improved accuracy of the determined position of the RFID tag 116 as determined by the locationing server 114.

Figure 3:
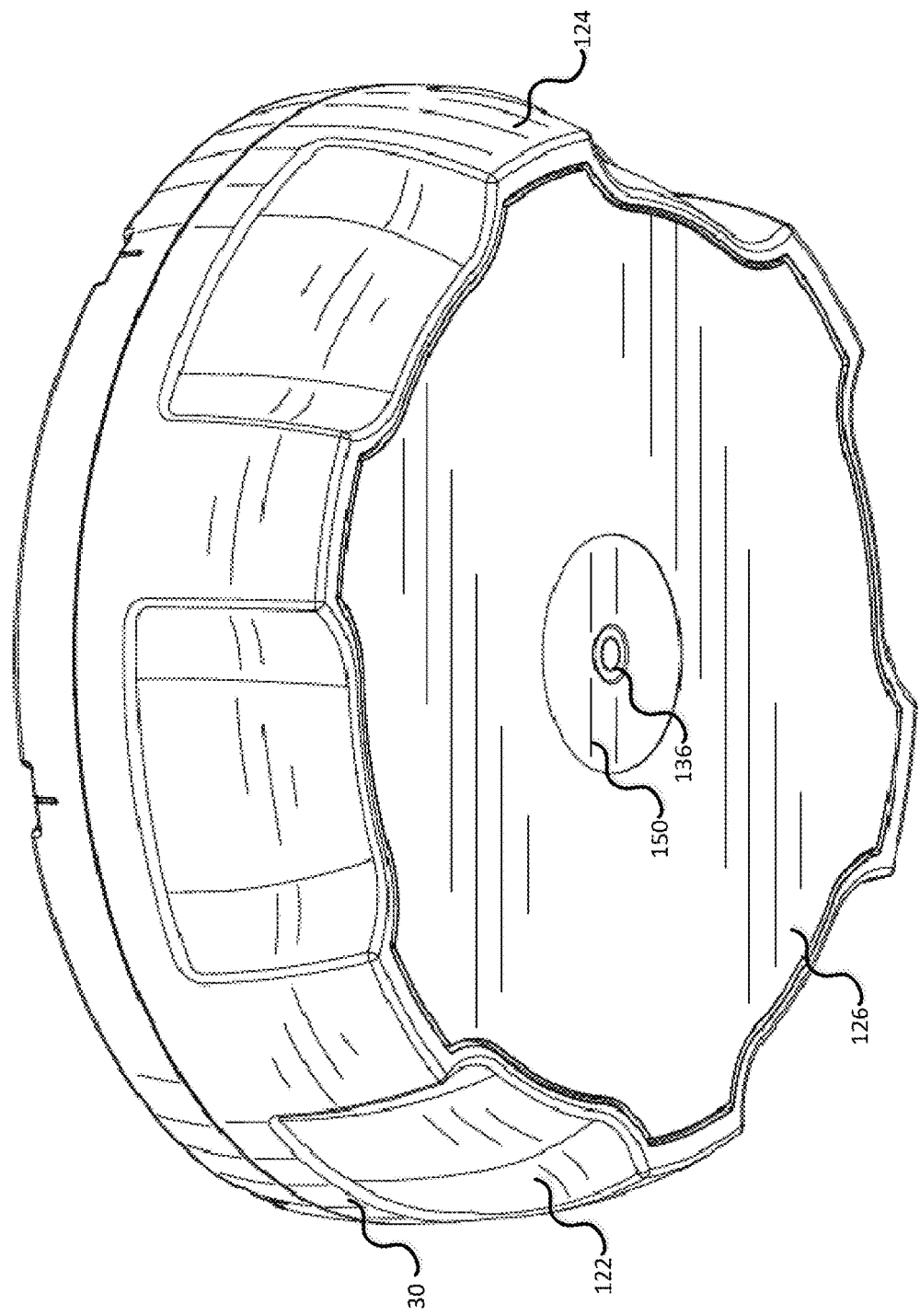
FIG. 3 is a bottom-up perspective view of an RFID reader illustrating a primary identifier positioned in a central portion of a first surface of the RFID reader that may be used during a calibration procedure.

FIG. 3 illustrates a bottom-up perspective view of one of the RFID readers 30 illustrating the primary identifier 136 positioned in a central portion 150 of the first surface 126. In the example shown, the central portion 150 is circular and the primary identifier 136 is positioned in the center of the central portion 150. Furthermore, in the example shown, at least a portion of the housing 124 has a periphery that is substantially circular about an axis that passes through the primary identifier 136. The axis is a substantially vertical axis when the RFID reader 30 is suspended from the ceiling 14 as shown in FIG. 1 (reference number 180 included in FIG. 5 identifies the axis).

Figure 4:
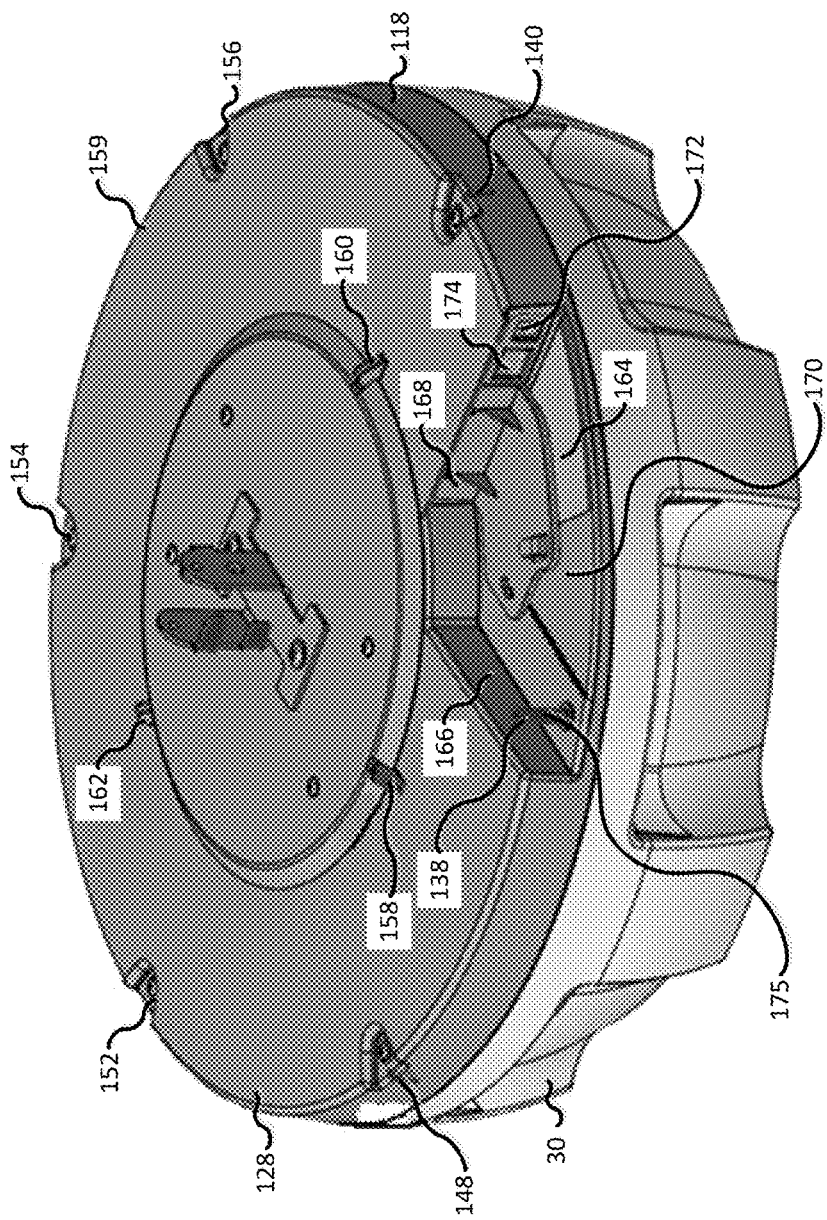
FIG. 4 is a top-down perspective view of the RFID reader of FIG. 3 illustrating a plurality of secondary identifiers that may be used during the calibration procedure.

FIG. 4 illustrates a top-down perspective view of the RFID reader 30 illustrating the secondary identifiers 138, 140. The RFID reader 30 also includes the plurality of additional secondary identifiers 148, 152, 154, 156. In the example shown, axes extending between the central axis and through each of the pairs of the secondary identifiers 148 and 152, 152 and 154, 154 and 156, 156 and 140 are positioned approximately 60° apart. Thus, if an unobstructed line of sight is not available for one of the secondary identifiers 148, 152, 154, 156, 140 during the calibration procedure, the data capture device 104 may be aimed at another one of the secondary identifiers 148, 152, 154, 156, 140 with confidence that a known-fixed relationship exists between each of the secondary identifiers 148, 152, 154, 156, 140 and the antenna array 141. In the example shown, the secondary identifiers 140, 148, 152, 154, 156 are formed by notches that are defined along of periphery of the RFID reader 30 at an edge 159 between the second surface 128 and the side wall 130.

The second surface 128 also includes a plurality of azimuth identifiers 158, 160, 162. In the example shown, the azimuth identifiers 158-162 are formed as ribs. The azimuth identifier 158 may be used to orient the RFID reader 30 when the RFID reader 30 is suspended from the ceiling 14 based on the relative position between the azimuth identifier 158 and the antenna array 141. Specifically, during the installation process, the azimuth identifier 158 of each of the RFID readers 30 may be pointed in the same direction when the RFID readers 30 are hung from the poles 132, for example, positioned toward true north. For example, the azimuth identifier 158 may be a guide to point the RFID readers 30 to true north. In other instances, the reference azimuth may be an arbitrarily established azimuth and may not be associated with "true north," such that all or a given subset of the azimuth identifiers 158 of the RFID readers 30 are pointed in the same direction as the reference azimuth. Put another way, when the RFID readers 30 are suspended from the ceiling 14, the housing 124 of the RFID readers 30 are positioned such that the azimuth identifier 158 is positioned at a substantially predetermined azimuth value relative to a vertical axis that passes through the primary identifier 136, where the azimuth identifier 158 is associated with the predetermined azimuth value.

The base 118 forming the second surface 128 and a portion of the side wall 130 defines a notch 164. The notch 164 includes notch walls 166, 168 and a surface 170 that extends between the notch walls 166, 168. The notch wall 166 may provide a visual identifier as to the location of the secondary identifier 138. Thus, the notch wall 166 may assist an operator when aiming the data capture device 104 at the secondary identifier 138 during the calibration process. In the example shown, the notch wall 168 defines Input/Output (I/O) ports 172, 174. A standoff 175 may extend from the surface 170, which may be associated with the secondary identifier 138.

Figure 5:
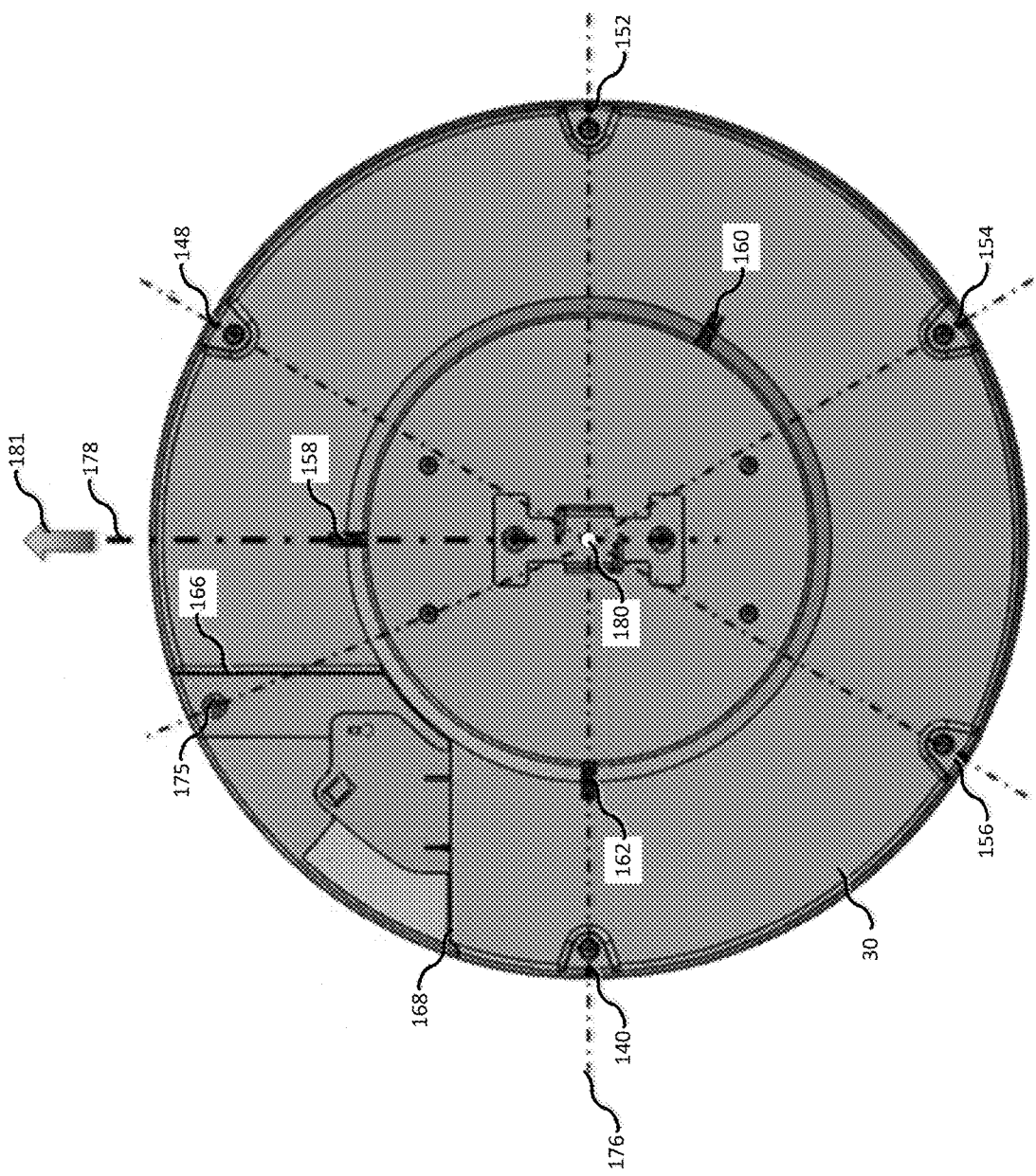
FIG. 5 is a plan-top view of the RFID reader of FIG. 3 illustrating the plurality of secondary identifiers.

FIG. 5 illustrates a plan-top view of the RFID reader 30 including the secondary identifiers 140, 148, 152, 154, 156 and the azimuth identifiers 158, 160, 162. In the example shown, the secondary identifier 140 and the azimuth identifier 162 are positioned along a first axis 176 and the azimuth identifier 158 is aligned along a second axis 178. The first axis 176 is substantially perpendicular to the second axis 178. Furthermore, a central axis 180 that extends through the RFID reader 30 and the primary identifier 136 is substantially perpendicular to the first axis 176. Given that the secondary identifiers 140, 148, 152, 154, 156 are positioned about a periphery of the RFID reader, in the example shown, the secondary identifiers 140, 148, 152, 154, 156 are equally spaced relative to the central axis 180. However, one or more of the secondary identifiers 140, 148, 152, 154, 156 may be in a different location such that the identifiers 140, 148, 152, 154, 156 are not equally spaced relative to the central axis 180. An arrow 181 is also shown representing a direction that the RFID readers 30 may be oriented using the azimuth identifier 158, when an operator couples the RFID readers 30 to the poles 132. The arrow 181 may represent "true north" or another designated reference azimuth.

Figure 6:
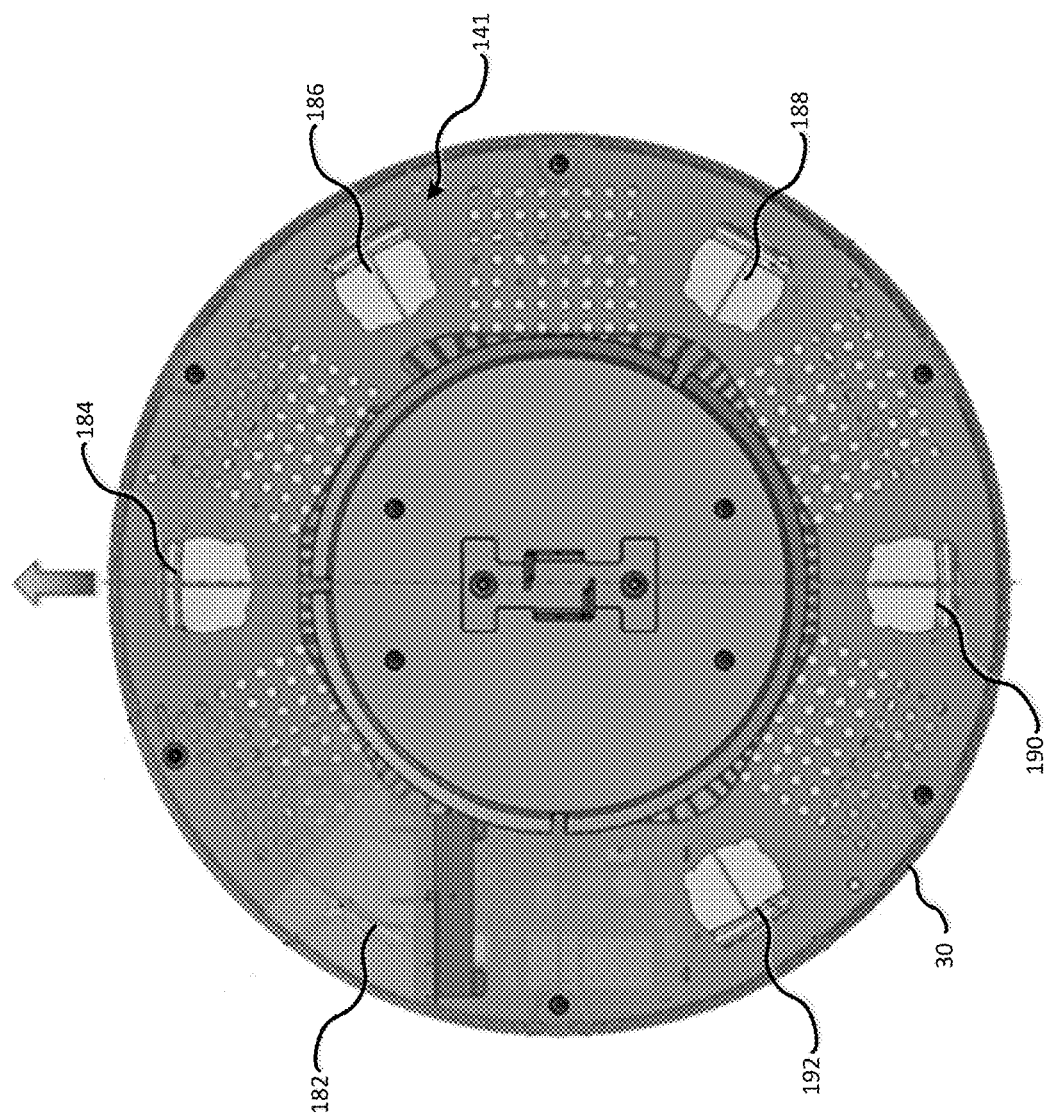
FIG. 6 is a plan-top view of an antenna array of the RFID reader of FIG. 3 showing the RFID reader without the radome.

FIG. 6 illustrates a plan-top view of the antenna array 141. The antenna array 141 includes first and second antenna elements 182, third and fourth antenna elements 184, fifth and sixth antenna elements 186, ninth and tenth antenna elements 188, eleventh and twelfth antenna elements 190 and thirteenth and fourteenth antenna elements 192. The seventh and eighth antenna elements are centrally positioned within the RFID reader 30 and are not visible in FIG. 5. While fourteen antenna elements are mentioned in the example of FIG. 6, RFID readers implemented in accordance with the teachings of this disclosure may have any number of antenna elements (e.g., 8, 10, 12, 16, etc.).

Figure 7:
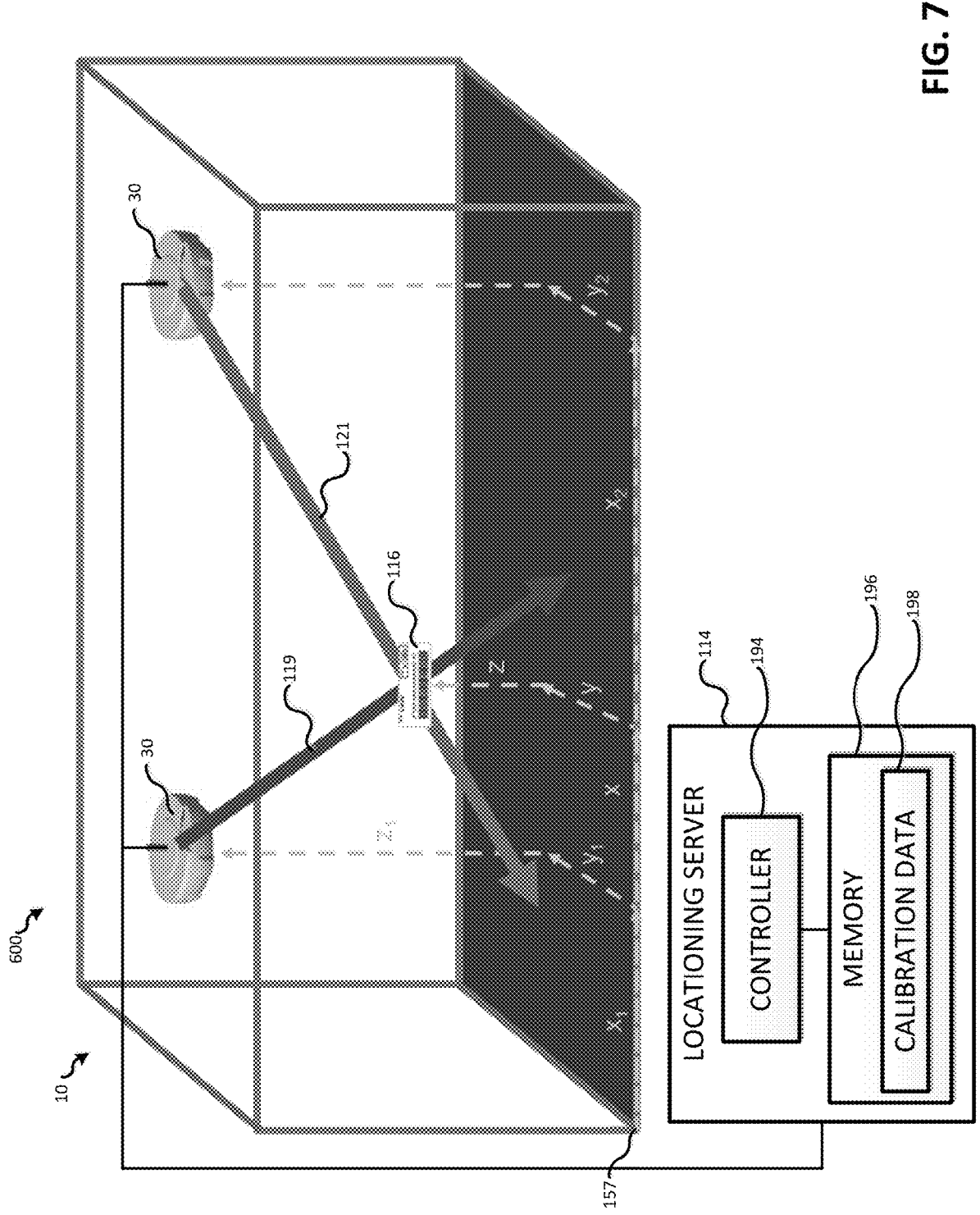
FIG. 7 illustrates the venue including a RFID reader locationing system in accordance with the teachings of this disclosure.

FIG. 7 illustrates a radio (RF) identification (RFID) reader locationing system 600 in accordance with an embodiment of the present disclosure. The RFID locationing system 600 includes the RFID readers 30 and the locationing server 114. As described previously, each RFID reader 30 is associated with a special position relative to a given reference point and an orientation relative to, for example, true north and/or the surface of the floor of the venue 10. As illustrated in the figure, one of the readers 30 is associated with a spatial location $X_1$, $Y_1$, and $Z_1$ and another of the RFID readers 30 is associated with a spatial location $X_2$, $Y_2$, and $Z_2$, with both locations being expressed relative to a reference point 157 (in this case, a corner of the venue 10). Each spatial location $X_a$, $Y_b$, and $Z_c$ may be associated with any portion of the respective RFID reader 30. For instance, spatial location $X_a$, $Y_b$, and $Z_c$ may be associated with a central portion of the antenna array housed within the reader. $X_1$, $Y_1$, $Z_1$, along with at least one of Yaw1, Pitch1, or Azimuth1 and $X_2$, $Y_2$, $Z_2$ along with at least one of Yaw2, Pitch2, or Azimuth2 are calibration data 198 used to estimate the location of RFID tag 116. The locationing server 114 includes a controller 194 and a memory 196. Calibration data 198 is stored on the memory 196 and is used by the locationing server 114 to compensate for differences between the azimuth of the respective RFID readers 30 and an associated reference azimuth. As discussed in association with FIG. 2, the calibration data may be determined by the controller 106 based on the coordinates of the primary identifier 136 and the secondary identifiers 138, 140.

In the example shown, the locationing server 114 is in communication with each of the RFID readers 30. To estimate a position of the RFID tag 116 within the venue 10, the locationing server 114 receives at least one bearing of the RFID tag 116 from each of at least two RFID readers 30. In the example of FIG. 7, one of the RFID readers 30 determines that the RFID tag 116 is located along the bearing illustrated by a first ray 119 and another of the RFID readers 30 determines that the RFID tag 116 is located along the bearing illustrated by a second ray 121. This data is transmitted to the locationing server 114 where the bearing data, along with the location/orientation data of each of the RFID readers is used to compute/estimate the location of the RFID tag 116. It should be appreciated that the bearing information received from the either of the RFID readers 30 is information associated with the angle of arrival (e.g., elevation and azimuth) of the signal from the RFID tag 116 relative each RFID reader 30 and not relative to the overall venue. In other words, information associated with the first ray 119 and transmitted to the locationing server 114 is oriented relative to the RFID reader 30 and not necessarily to the venue 10. However, once received by the locationing server 114, the location of the point of origin of the ray 119 can be associated with the spatial location $X_1$, $Y_1$, and $Z_1$, and the angle of arrival of the ray 119 can be corrected (and thus expressed relative to the special layout of the venue 10 and not specifically the RFID reader 30) based on at least one of Yaw1, Pitch1, or Azimuth1. The same is done for ray 121.

From there, the locationing server 114 can estimate the location of the RFID tag 116 by determining the point in venue space where ray 119 and ray 121 intersect. In the event that rays 119 and 121 do not intersect, the locationing server 114 may determine the minimum distance between ray 119 and ray 121, and establish the location of the RFID tag 116 to be mid-way between ray 119 and ray 121 along a line defined by the minimum distance between the two rays.

Figure 8:
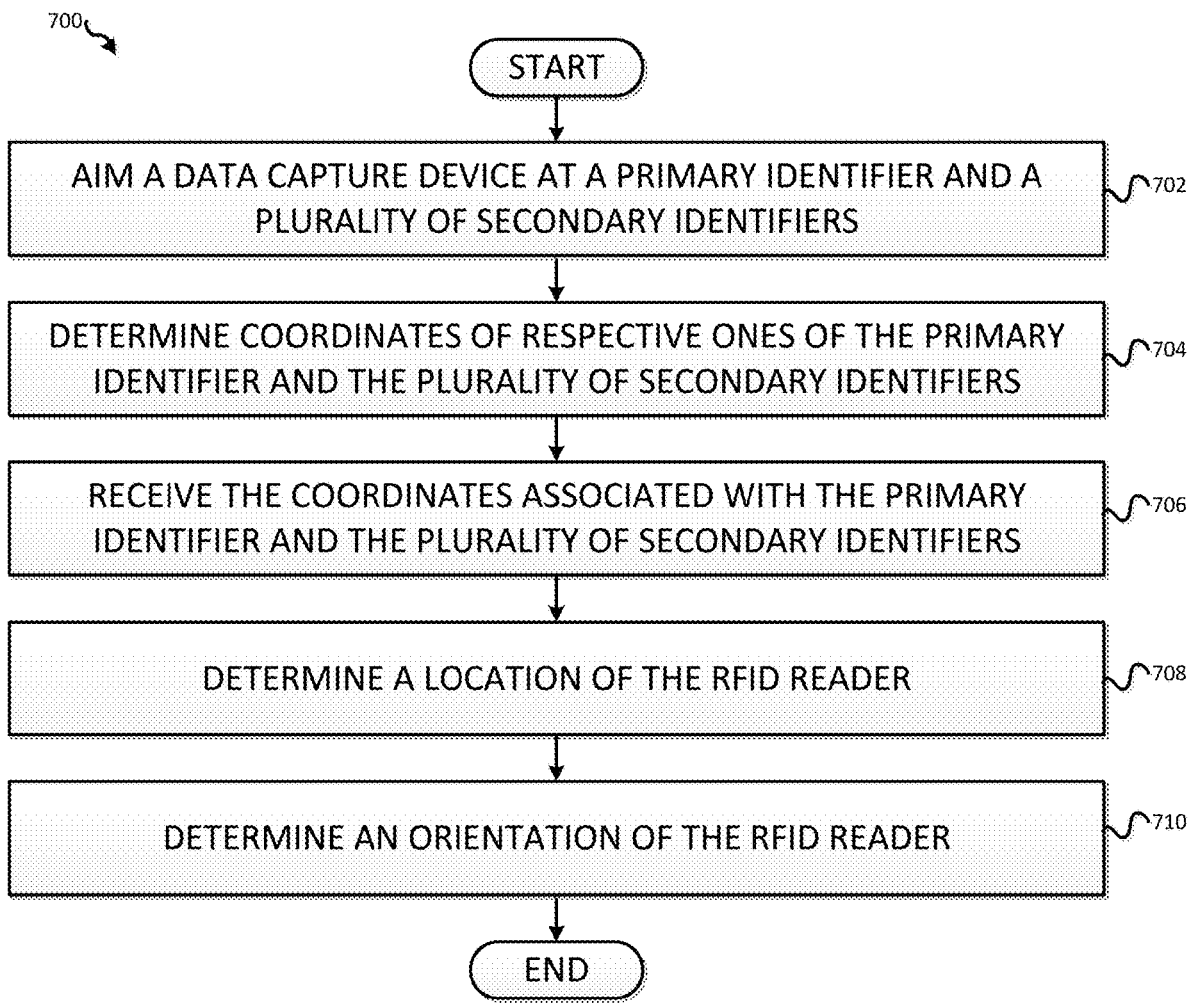
FIG. 8 illustrates a flowchart for performing a method of calibrating the RFID reader locationing system of FIG. 7, as implemented by the RFID reader calibration system of FIG. 2.

FIG. 8 illustrates a flowchart for performing a method of calibrating the RFID reader locationing system 600 of FIG. 7, as implemented by the RFID reader calibration system 102 of FIG. 2. A process 700 begins at block 702 when the data capture device 104 is aimed at the primary identifier 136 and the plurality of secondary identifiers 138, 140. In response to aiming the data capture device 104 at the identifiers 136, 138, 140, the data capture device 104 determines coordinates of respective ones of the primary identifier 136 and the plurality of secondary identifiers 138, 140 (block 704). At block 706, the controller 106 receives the coordinates associated with the primary identifier and the plurality of secondary identifiers. In response to receiving the coordinates, the controller 106 determines a location of the RFID reader 30 based on the coordinates of the primary identifier 136 (block 708) and determines an orientation of the RFID reader 30 based on the respective coordinates of the primary identifier 136 and based on the coordinates of each of the plurality of secondary identifiers 138, 140 (block 710). The orientation includes at least one pitch, roll, and azimuth.

From the foregoing, it will be appreciated that the above disclosed apparatus, methods and articles of manufacture relate to improving the accuracy with which locations of RFID tags can be determined. Specifically, the disclosed examples relate to reducing errors imparted into the determined locations based on one or more of the locations of the RFID readers or an orientation of the RFID readers. To more accurately determine the location and the orientation of the RFID readers, the RFID readers disclosed include identifiers. Some of the identifiers may include a primary identifier and a plurality of secondary identifiers or, more generally, visual identifiers that may be used to install and calibrate RFID readers in an RFID reader locationing system.

The identifiers may be fixed relative to an antenna array of the RFID reader. Thus, when installing a plurality of RFID readers, at least one of the identifiers can be used to allow all of the plurality of RFID readers to be initially oriented in the same general direction. In other words, the identifiers allow RFID readers to be installed in an RFID system without requiring highly skilled operators to achieve a result in which all of the RFID readers and their associated antenna arrays are positioned in a desired direction. For example, an operator with limited training may install the plurality of RFID readers such that the antenna arrays are all oriented such that the third and fourth antenna elements of the antenna array face a north wall of a building. The one of the identifiers may be referred to as an azimuth-visual identifier and may be formed by ribs on a surface of the RFID readers that face the ceiling.

As should be apparent from the present disclosure, accurate bearing estimation of an RFID tag alone may be insufficient to establish an accurate location of an RFID tag. Instead, the accuracy of the determination of the location of the RFID tag is highly dependent on the relative location and orientation of any and all RFID tag readers used to obtain the RFID tag bearings relative to each other and relative to the spatial layout of the venue. As such, the methods and systems described herein provide efficient and effective solutions for establishing an accurate location and orientation of RFID readers within a venue relative to each other and relative to that venue. This in turn further translates into a more accurate baseline for later RFID-tag estimations and provides an advantage over other systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A radio frequency (RF) identification (RFID) reader calibration system for use with a venue, comprising:
    an RFID reader, the RFID reader suspended from a ceiling, the RFID reader having a housing, the housing having:
        a first surface facing a downward direction away from the ceiling and toward a floor of the venue;
        a second surface facing an upward direction toward the ceiling; and
        a sidewall extending between the first surface and the second surface;
    the RFID reader further having a primary identifier and a plurality of secondary identifiers, the primary identifier positioned on the first surface and the plurality of secondary identifiers positioned on at least one of the second surface and the sidewall, the primary identifier and each of the plurality of secondary identifiers having a respective unobstructed line of sight to a point on the floor of the venue;

a data capture device, the data capture device configured to be aimed at the primary identifier and the plurality of secondary identifiers and to capture respective coordinates of the primary identifier and each of the plurality of secondary identifiers; and a controller configured to (i) receive, from the data capture device, the respective coordinates of the primary identifier and each of the plurality of secondary identifiers and (ii) to determine:

a location of the RFID reader based on the coordinates of the primary identifier; and an orientation of the RFID reader based on the respective coordinates of the primary identifier and based on the coordinates of each of the plurality of secondary identifiers, the orientation including at least one pitch, roll, and azimuth.

2. The RFID reader calibration system of claim 1, wherein the each of the plurality of the secondary identifiers is positioned an equal distance from a substantially vertical axis extending through the primary identifier.

3. The RFID reader calibration system of claim 1, wherein at least a portion of the housing of the RFID reader has a periphery that is substantially circular about a substantially vertical axis passing through the primary identifier.

4. The RFID reader calibration system of claim 3, wherein the first surface has a central portion, the primary identifier is positioned in the central portion, and the plurality of secondary identifiers are positioned along a periphery of the sidewall.

5. The RFID reader calibration system of claim 1, further comprising a locationing server, the locationing server configured to compare at least one of the location of the RFID reader and the orientation of the RFID reader to a reference orientation to generate calibration data, wherein the calibration data compensates for a difference between the orientation of the RFID reader and the reference orientation.

6. The RFID reader calibration system of claim 5, wherein the locationing server is configured to determine a location of an RFID tag based on bearing data obtained from the RFID reader and the calibration data.

7. The RFID reader calibration system of claim 1, wherein the primary identifier and the plurality of secondary identifiers are fixed relative to an antenna array of the RFID reader.

8. The RFID reader calibration system of claim 1, further comprising an azimuth identifier positioned on the second surface, the azimuth identifier being associated with a predetermined azimuth value, and wherein when the RFID reader is suspended from the ceiling, the housing is positioned such that the azimuth identifier is positioned substantially at the predetermined azimuth value relative to a substantially vertical axis passing through the primary identifier.

9. The RFID reader calibration system of claim 1, wherein the plurality of secondary identifiers comprise notches, the notches defined by at least one of the second surface and the sidewall along a periphery of the RFID reader.

10. A method of calibrating a radio frequency (RF) identification (RFID) system for use in a venue, the method comprising:

aiming a data capture device at a primary identifier and a plurality of secondary identifiers of an RFID reader to determine coordinates of respective ones of the primary identifier and the plurality of secondary identifiers, the RFID reader having a housing having a first surface facing a downward direction away from a ceiling and toward a floor of the venue, and a second surface facing an upward direction toward the ceiling, and a sidewall extending between the first surface and the second surface, the primary identifier positioned on the first surface and the plurality of secondary identifiers positioned on at least one of the second surface and the sidewall, the primary identifier and the plurality of secondary identifiers having an unobstructed line of sight to a point on the floor of the venue; and receiving the coordinates associated with the primary identifier and the plurality of secondary identifiers at a controller and determining:

a location of the RFID reader based on the coordinates of the primary identifier; and an orientation of the RFID reader based on the respective coordinates of the primary identifier and based on the coordinates of each of the plurality of secondary identifiers, the orientation including at least one pitch, roll, and azimuth.

11. The method of claim 10, further comprising, prior to aiming the data capture device at the primary identifier and the plurality of secondary identifiers, positioning the housing such that an azimuth identifier is positioned substantially at a predetermined azimuth value relative to a substantially vertical axis passing through the primary identifier, the azimuth identifier positioned on the second surface, the azimuth identifier being associated with the predetermined azimuth value.

12. The method of claim 11, further comprising orienting a plurality of RFID readers based on associated azimuth identifiers.

13. The method of claim 10, further comprising comparing at least one of the location of the RFID reader and the orientation of the RFID reader to a reference orientation to generate calibration data, wherein the calibration data compensates for a difference between the orientation of the RFID reader and the reference orientation.

14. The method of claim 10, wherein at least a portion of the housing of the RFID reader has a periphery that is substantially circular about a substantially vertical axis passing through the primary identifier.

15. A radio frequency (RF) identification (RFID) locationing system for use in a venue, comprising:

a plurality of RFID readers suspended from a ceiling of the venue, each of the RFID readers configured to estimate a bearing of an RFID tag positioned within the venue, each of the plurality of RFID readers having:

a housing with (i) a first surface facing a downward direction away from the ceiling and toward a floor of the venue, (ii) a second surface facing an upward direction toward the ceiling, and (iii) a sidewall extending between the first surface and the second surface;

a primary identifier positioned on the first surface; and a plurality of secondary identifiers positioned on at least one of the second surface and the sidewall, the primary identifier and each of the plurality of secondary identifiers having a respective unobstructed line of sight to a point on the floor of the venue; and a locationing server in communication with each of the plurality of RFID readers, the locationing server configured to (i) receive a plurality of bearings of the RFID tag from at least two of the RFID readers, each of the plurality of bearings of the RFID tag being received from one of the at least two of the RFID readers, and (ii) estimate a position of the RFID tag within the venue based on the (i) plurality of bearings of the RFID tag, (ii) a respective location of each of the at least two of the RFID readers, and (iii) a respective orientation of each of the at least two of the RFID readers, wherein the respective location of each of the at least two of the RFID readers is determined by a controller and is based at least on primary coordinate data associated with the primary identifier of each of the at least two of the RFID readers, the primary coordinate data associated with the primary identifier of each of the at least two of the RFID readers being received by the controller from an optical data capture device configured to capture respective coordinates of the primary identifier of each of the at least two of the RFID readers, and wherein the respective orientation of each of the at least two of the RFID readers is determined by the controller and is based at least on the primary coordinate data associated with the primary identifier of each of the at least two of the RFID readers and secondary coordinate data associated with the plurality of secondary identifiers of each of the at least two of the RFID readers, the secondary coordinate data associated with the plurality of secondary identifiers of each of the at least two of the RFID readers being received by the controller from the optical data capture device configured to capture respective coordinates of the plurality of secondary identifiers of each of the at least two of the RFID readers.

16. The RFID locationing system of claim 15, wherein the each of the plurality of the secondary identifiers is positioned an equal distance from a substantially vertical axis extending through the primary identifier.

17. The RFID locationing system of claim 15, wherein at least portion of the housing of the plurality of RFID readers has a periphery that is substantially circular about a substantially vertical axis passing through the primary identifier.

18. The RFID locationing system of claim 15, wherein the primary identifier and the plurality of secondary identifiers are fixed relative to an antenna array of the respective ones of the plurality of RFID readers.

19. The RFID locationing system of claim 15, further comprising an azimuth identifier positioned on the second surface of the plurality of secondary identifiers, the azimuth identifier being associated with a predetermined azimuth value, and wherein when the plurality RFID readers are suspended from the ceiling, the housings of the respective ones of the plurality of RFID readers are positioned such that the azimuth identifier is positioned substantially at the predetermined azimuth value relative to a substantially vertical axis passing through the primary identifier.

20. The RFID locationing system of claim 15, wherein plurality of RFID readers are oriented based on associated azimuth identifiers.

* * * * *